(12) United States Patent
Garrett et al.

(10) Patent No.: US 8,345,710 B2
(45) Date of Patent: Jan. 1, 2013

(54) FDT FOR EDDL-BASED FIELD DEVICES

(75) Inventors: Nicholas Garrett, Leicestershire (GB); Stefan Trebing, Schwerin (DE)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1138 days.

(21) Appl. No.: 11/558,668

(22) Filed: Nov. 10, 2006

(65) Prior Publication Data

US 2008/0112388 A1 May 15, 2008

(51) Int. Cl.
*H04J 3/16* (2006.01)
*H04J 3/22* (2006.01)
*H04L 12/26* (2006.01)

(52) U.S. Cl. ........................................ 370/466
(58) Field of Classification Search ................ None
See application file for complete search history.

(56) References Cited

U.S. PATENT DOCUMENTS

| | | | | |
|---|---|---|---|---|
| 5,960,214 | A | 9/1999 | Sharpe, Jr. et al. | 395/835 |
| 7,098,771 | B2 | 8/2006 | Lefebvre et al. | 340/286.02 |
| 2003/0195825 | A1 | 10/2003 | Ehrman et al. | 705/28 |
| 2004/0230582 | A1 | 11/2004 | Pagnano et al. | 707/100 |
| 2005/0267964 | A1* | 12/2005 | Kech et al. | 709/223 |
| 2007/0067767 | A1* | 3/2007 | Da Silva Neto | 717/174 |
| 2007/0078540 | A1* | 4/2007 | Bump et al. | 700/90 |
| 2007/0079250 | A1* | 4/2007 | Bump et al. | 715/762 |
| 2009/0204458 | A1* | 8/2009 | Wiese et al. | 705/7 |

FOREIGN PATENT DOCUMENTS

| RU | 296 360 C2 | 10/2005 |
|---|---|---|
| WO | WO 2004/042482 A1 | 5/2004 |

OTHER PUBLICATIONS

Author Unknown, The FDT interface Specification, Version 1.2.1, FDT Joint Interest Group, pp. 1-37, Mar. 2005.*
"Notification of Transmittal of the International Search Report and The Written Opinion of the International Searching Authority, or the Declaration" for PCT/US2007/023422, international filing of Jul. 11, 2007; 13 pages.
"Field Device Integration", Neuman et al., Emerging Technologies and Factory Automation, 2001; Proceedings 2001 8th IEEE International Conference on Oct. 15-18, 2001; Piscataway, NJ, USA, IEEE, vol. 2, Oct. 15, 2001, pp. 63-68, XP010589079, ISBN: 978-0-7803-7241-2.
Control Magazine, "Fieldbus Wars Continue: EDDL vs. FDT/DTM, Now That EDDs Have Been Defined as a Standard by the IEC, is there any Need for FDT?" by Dick Caro, ER-00007-SEPT05, Sep. 2005, 4 pages.

(Continued)

Primary Examiner — Faruk Hamza
Assistant Examiner — Christopher Crutchfield
(74) Attorney, Agent, or Firm — Westman, Champlin & Kelly, P.A.

(57) ABSTRACT

A Field Device Tool (FDT)-based application is provided. The FDT-based application includes at least one communication Device Type Manager (communication DTM) and a router Device Type Manager (DTM). The communication DTM corresponds with a type of communication protocol that an at least one plant asset follows. The communication DTM is configured to provide an interface for communication between the FDT-based application and the communication protocol that the plant asset follows. The router DTM is coupleable to an asset optimization device manager that includes electronic device description language (EDDL), the router DTM is configured to transfer data from the asset optimization device manager to the at least one communication DTM for communication with the plant asset.

10 Claims, 3 Drawing Sheets

OTHER PUBLICATIONS

"Why Electronic Device Description Language (EDDL) Technology is the Right Choice for Smart Plant Installations", Whitepaper, EDDL Technology, May 2005, 15 pages.

"FDT Technical Desccription / Open Access to Device Intelligence", www.fdtgroup.org, prior to Feb. 2007, 13 pages.

Office Action from corresponding Russian Patnet Application No. 2009122191/09, dated Jul. 29, 2010.

"FDT/DTM Specifications and PACTware Consortium", by Zhdankin, Mar. 2002.

Communication issued by EPO for related foreign application No. 07861778.4-1244; date Nov. 12, 2009; 5 pages.

Notification from corresponding Russian Patent Application No. 2009122191/09, dated Dec. 31, 2010.

First Office Action (including English translation) from Chinese Application No. 200780041486.1, issued Feb. 22, 2012, 9 total pages.

Official Decision of Grant from corresponding Russian Patent Application No. 2009122191, dated Dec. 2, 2011.

"Technical Problem and Trend in Measurement and Control Network", by Y. Takayanagi, Nippon Kogyou Syuppan Inc., Jul. 2006, vol. 34, No. 8, pp. 5-9.

"Solution Package for Plant Management and Operation Support", by K. Gijyutusha, Sep. 2006, vol. 49, No. 9, pp. 73-77.

"Standardization and Open in New Information Control System" by K. Gijyutusha, Jan. 2005, vol. 48, No. 1, pp. 41-45.

Office Action from corresponding Japanese Patent Application No. 2009-536279, dated Jan. 18, 2012.

Canadian Office Action for corresponding Canadian Application No. 2,668,879, dated Mar. 2, 2012, 5 pages.

FDT-Joint Interest Group, *"FDT Joint Interest Group Guideline: FDT Interface Specification"*, Version 1.2.1, Mar. 2005, pp. 1-385, http://www.fdtgroup.org/technical-documents.

Rejection Notice from Japanese Application No. 2009-536279, issued Jul. 11, 2012, 3 pages.

\* cited by examiner

FDT FOR EDDL-BASED FIELD DEVICES

BACKGROUND

The present invention relates to asset management systems. More specifically, the invention relates to a field device tool (FDT) that allows EDDL (electronic description device language)-type device managers to access field devices.

Process plants, such as petroleum, pharmaceutical, chemical, pulp and other processing plants include many field devices which control and measure parameters or process variables within a process. Some common parameters or process variables include pressure, temperature, flow, conductivity, pH and other types of properties.

Field devices communicate with management systems by transmitting signals indicative of measurement values of the device or other types of device-specific information including calibration, configuration, diagnostic, maintenance and/or process information. Such field devices communicate via a communication protocol. In general, field devices can follow the HART® communication protocol (a registered trademark of the HART®Communication Foundation), the FOUNDATION™ fieldbus communication protocol (based on ISA-550.01-1992, promulgated by the Instrument Society of America in 1992 and practical implementation specified by the Fieldbus Foundation (FF)) or other types of protocols.

The above-mentioned communication protocols only allow device manufacturers to provide device-specific types of information on a device by device basis. Therefore, the particular types of information provided by each type of field device is different and consequently the communication protocols are complex and difficult to use in device programming. In particular, the above-mentioned communication protocols do not provide a consistent way to communicate with every type of field device.

One way in which communications with field devices have been simplified is with the use of electronic device description language (EDDL) in asset optimization device managers. EDDL source files include human-readable text written and are provided by device manufacturers. These files specify all the information available about a field device and also a fieldbus connected to the field device.

Another way in which communications with field devices have been simplified is with Field Device Tool (FDT) technology, as provided by the FDT Group. FDT-based applications allow users to utilize an advanced graphical user interface to interact with the host or management system. FDT technology allows any field device to be accessed from any host through any protocol. FDT technology includes the use of a frame application and various types of Device Type Managers (DTMs), such as device DTMs and communication DTMs or equivalent.

New or existing field devices can operate with and be accessed by a FDT-based application. However, the DTMs of the FDT-based application may be insufficient to exploit certain features of the field devices with which it communicates, such as parameterization and diagnosis. EDDL-based asset optimization device managers have the ability to parameterize and diagnose such field devices. However, the existing bus system of the new or existing field devices is accessible only via communication DTMs or equivalent of the FDT-based application.

SUMMARY

In one embodiment, the disclosure is directed to a Field Device Tool (FDT)-based application. The FDT-based application includes at least one communication Device Type Manager (communication DTM) and a router Device Type Manager (DTM). The communication DTM corresponds with a type of communication protocol that an at least one plant asset follows. The communication DTM is configured to provide an interface for communication between the FDT-based application and the communication protocol that the plant asset follows. The router DTM is coupleable to an asset optimization device manager that includes electronic device description language (EDDL), the router DTM is configured to transfer data from the asset optimization device manager to the at least one communication DTM for communication with the plant asset.

In another embodiment, the disclosure is directed to an asset management system. The asset management system includes an asset optimization device manager and a FDT-based application coupled to the asset optimization device manager. The asset optimization device manager includes electronic device description language (EDDL). The FDT-based application is configured to transfer data from the asset optimization device manager to the plant asset using at least one communication DTM that corresponds with a type of communication protocol that an at least one plant asset follows.

DETAILED DESCRIPTION

Field devices are plant assets that monitor and measure parameters or process variables in a process of a plant. Field devices are capable of communicating with an asset management system. An asset management system interacts with field devices to retrieve parameters, variables or configurations of the devices to make available to a user such that a user is enabled to monitor and control processes. Example communications include measurement values or other types of device-specific information related to calibration, configuration, diagnostics, maintenance and process information. Such communications between field devices and an asset management system are performed via a communication protocol.

Field devices can follow many different kinds of communication protocols. For example, field devices can follow the HART® communication protocol, the FOUNDATION™ fieldbus communication protocol or other types of protocols. Communication protocols, independently, do not provide a consistent communication with every type of field device. A communication protocol provides a way for device manufacturers to specify what types of information the field device can provide to a user and how to retrieve that information.

To overcome the failures of the communication protocol, device manufacturers have, turned to asset optimization device managers which use electronic device description language (EDDL). EDDL source files include human-readable text written and are provided by device manufacturers. These EDDL source files specify all the information available about a field device and also the fieldbus connected to the field device. Such information includes core or essential parameter characteristics of the field device, group-specific and manufacturer-specific definitions and special features of the field device. The asset optimization device managers can compile an EDDL source file into a machine-readable format called a device description (DD), which can then be provided to an asset management system.

Figure 1:
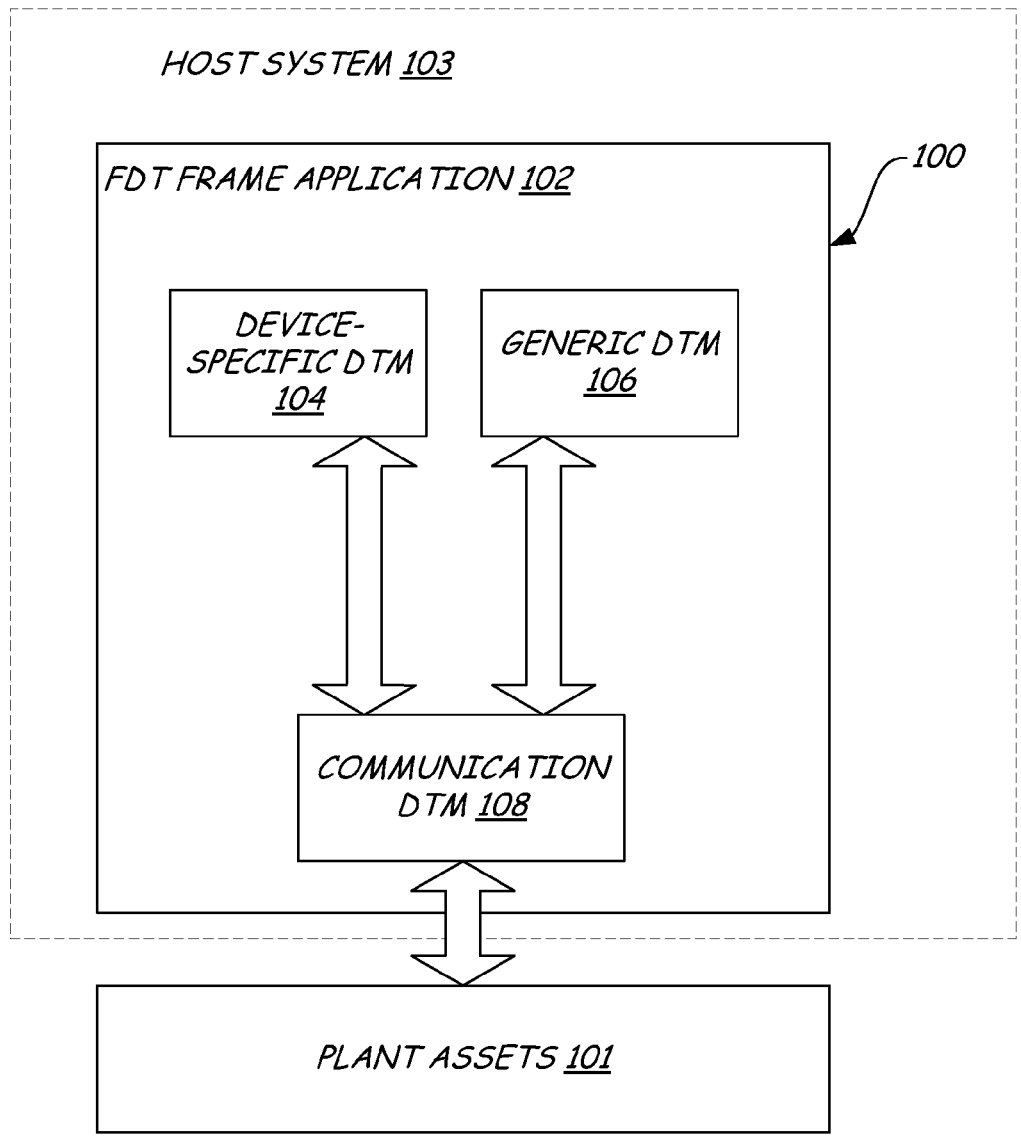
FIG. 1 is a block diagram of an exemplary Field Device Tool (FDT)-based application.

Device manufacturers have also turned to Field Device Tool (FDT) technology as another way to overcome the failures of the communication protocol. A FDT-based application 100, of which one is exemplary illustrated as a diagrammatic view in FIG. 1, allows users to utilize an advanced graphical user interface to interact with field devices or plant assets 101. FDT-based application 100 is shown implemented on a host system 103 which it configures as described. Examples of plant assets 101 include transmitters having sensors, actuators, drives, voltage switchgear gateways, remote input/outputs (RIOs), controllers and etc. FDT-based application 100 includes a FDT frame application 102. FDT frame application 102 includes user interface menu bars, toolbars and navigation trees. FDT frame application 102 surrounds various types of Device Type Managers (DTMs). In general, a DTM is a device or communication specific driver. One type of DTM is a device DTM 104. A device DTM is specific to a particular field device or plant asset and allows a user of FDT frame application 102 to interact with the field device that the device DTM is specific to. All information that a field device manufacturer wishes to make available is programmed in the device DTM by the field device manufacturer. Another type of DTM is a generic DTM 106. Generic DTM 106 is not specific to any particular field device. Generic DTM 106 is provided by the FDT-based application if a particular field device does not have an associated device DTM. Yet another type of DTM is a (i.e., commDTM) 108 or equivalent. Communication DTM 108 provides a standardized communication Application Process Interface (API) that interfaces between device or generic DTMs and the asset management system's driver that handles pass-through communications, such as a bus master. A communication DTM 108 is provided for each type of fieldbus protocol, such as a HART® communication protocol or FOUNDATION™ fieldbus communication protocol. Typically, FDT-based application 100 will include at least one of a device DTM 104 or generic DTM 106 for each plant asset and at least one communication DTM 108 for each corresponding type of communication protocol.

New or existing field devices or plant assets, such as plant assets 101, may operate with and be accessed by a FDT-based application, such as FDT-based application 100. However, the device or generic DTMs, such as 104 and 106, of the FDT-based application 100 may be insufficient to exploit certain features of the field devices or plant assets with which it communicates, such as parameterization and diagnosis. EDDL-based asset optimization device managers have the ability to parameterize and diagnose such field devices. However, the existing bus system of the new or existing field devices or plant assets is accessible only via communication DTMs or equivalents thereof of the FDT-based application. Therefore, integrating EDDL-based asset optimization device managers with an FDT-based application would allow the exploitation of the full functional capabilities of field device or plant assets of an asset management system.

Figure 2:
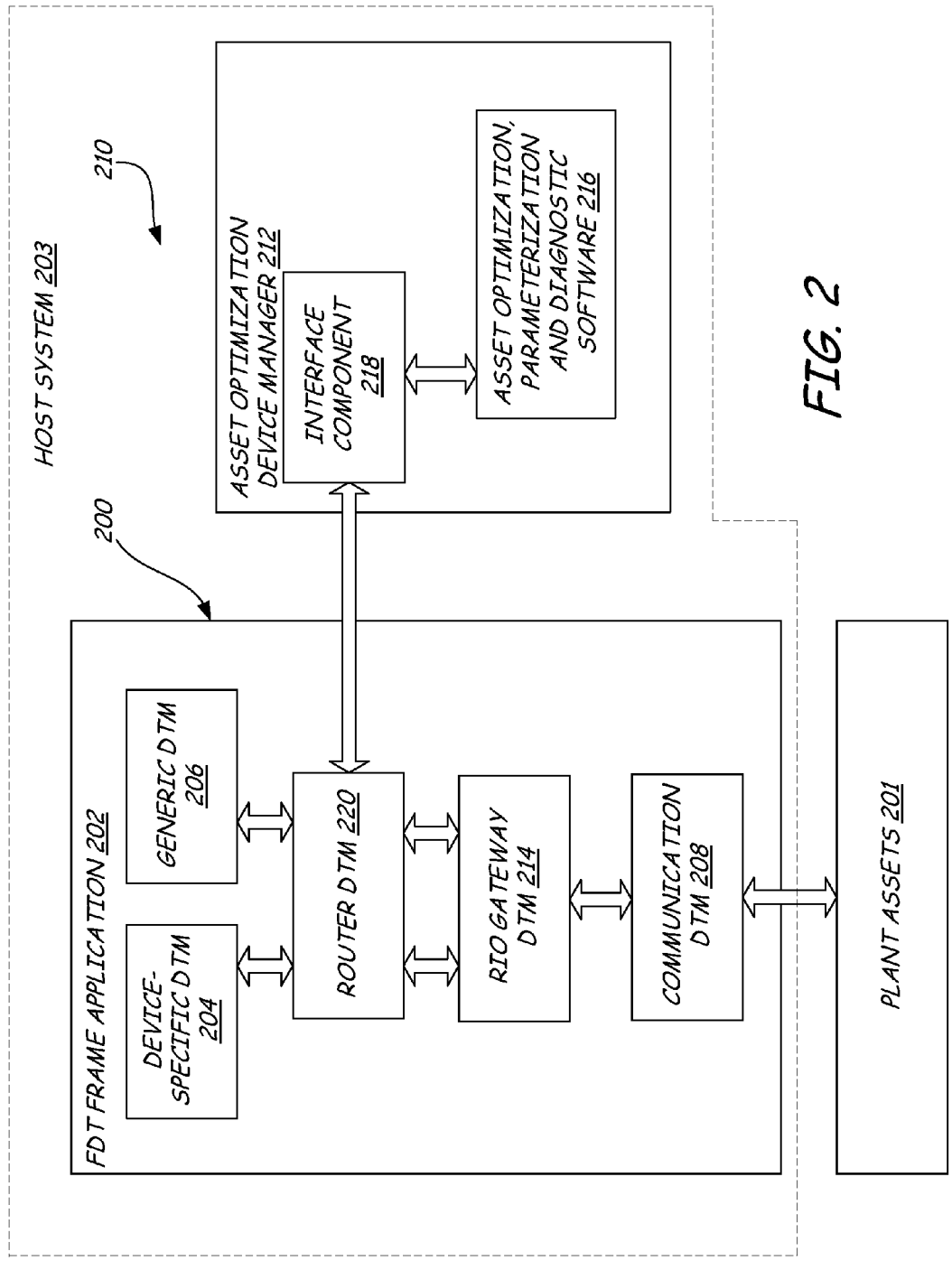
FIG. 2 is a block diagram of an embodiment of a portion of an asset management system.

FIG. 2 illustrates a portion of an asset management system 210. In FIG. 2, the portion of asset management system 210 includes a FDT-based application 200, an asset optimization device manager 212 and plant assets 201. It should be understood that asset management system 210 includes other components that are not particularly illustrated, such as a host system 203 configured to implement the asset management system.

FDT-based application 200 includes a FDT frame application 202, at least one device DTM 204, at least one generic DTM 206 and at least one communication DTM 208 or equivalent. Although not illustrated in FIG. 1, FDT-based application 200 of FIG. 2 also includes a remote input/output (RIO) gateway Device Type Manager (DTM) 214. RIO gateway DTM 214 enables device and generic DTMs 204 and 206 to connect to communication DTMs 208 and can functionally provide fieldbus communication with plant assets 201 and diagnosis of communication protocols. Asset optimization device manager 212 is an EDDL-based device manager that includes an asset optimization, parameterization and diagnostic software 216 that is coupleable to FDT-based application 200 by an interface component 218. An example asset optimization device manager includes the AMS™ suite as provided by Rosemount, Inc. of Eden Prairie, Minn.

In one embodiment, to integrate EDDL-based asset optimization device manager 212 with an FDT-based application 200, FDT-based application 200 includes a router Device Type Manager (DTM) 220. Router DTM 220 is interposed between at least one device DTM 204 and at least one generic DTM 206 and RIO gateway DTM 214 in FDT-based application 200. Router DTM 220 enables asset optimization device manager 212 to exchange data with field devices or plant assets 201 that otherwise were limited to exchanging data with device or generic DTMs 202 and 204 because of limitations of the bus system.

In operation, data requests are transferred from asset optimization device manager 212 to router DTM 220 via interface component 218. Router DTM 220 forwards the data request to RIO gateway DTM 214. RIO gateway DTM 214 connects the data requests to communication DTM 208 which forwards the data request to the appropriate plant asset with an appropriate communication protocol. In addition, router DTM 220 transfers data requests from device DTM 204 or generic DTM 206 to RIO gateway DTM 214. Router DTM 220 then automatically handles the transfer of information that is in response to the data request which is ultimately distributed to asset optimization, parameterization, and diagnostic software 216 or either device or generic DTMs 204 or 206 depending on whether the data request source was device or generic DTMs 204 or 206 or asset optimization device manager 212. Router DTM 220 in FDT-based application 200 is configured such that from the point of view of either device DTM 204 or generic DTM 206, router DTM 220 is treated as RIO gateway DTM 214. In addition, from the point of view of RIO gateway DTM 214, router DTM 220 is treated as either device DTM 204 or generic DTM 206.

Figure 3:
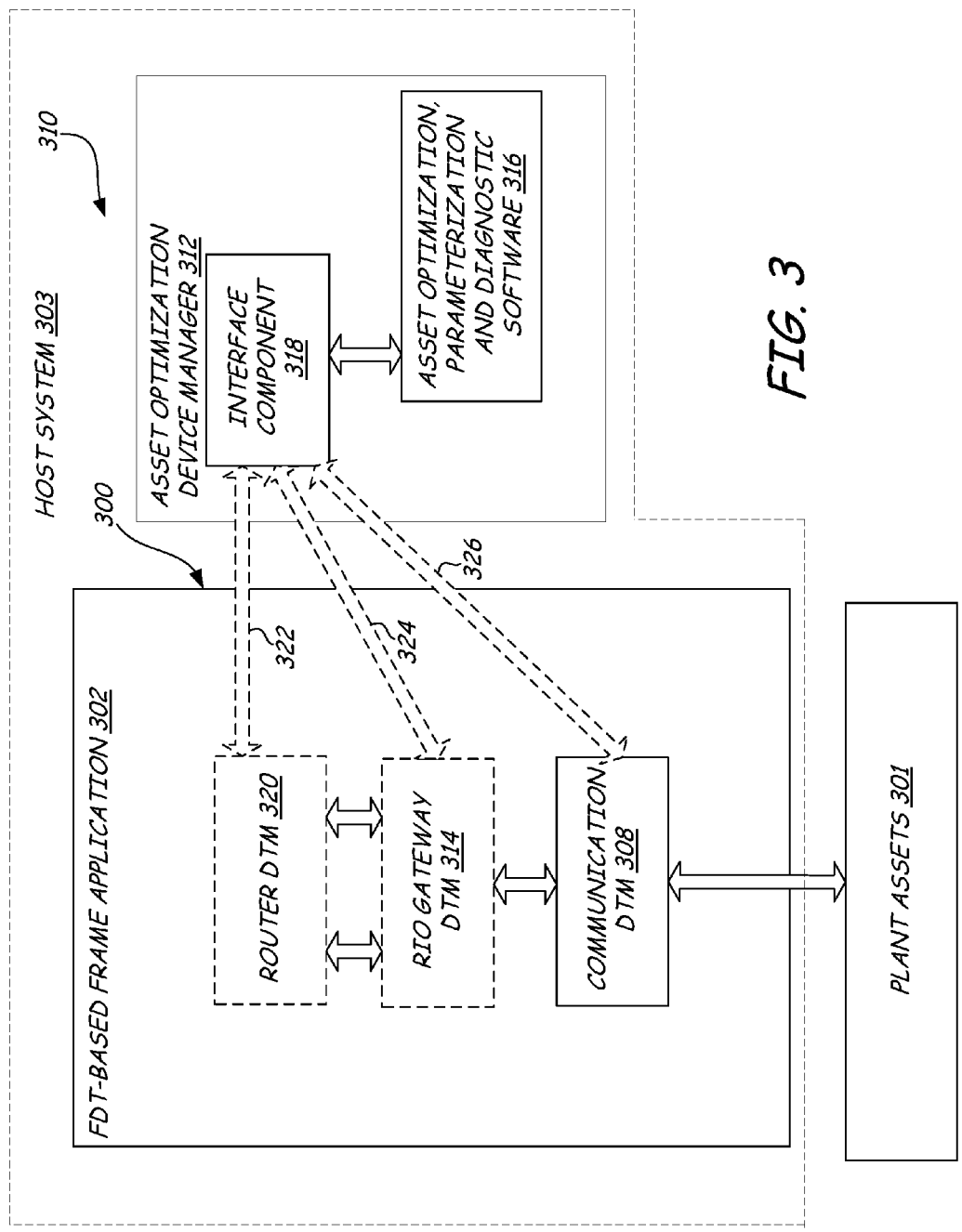
FIG. 3 is a block diagram of other embodiments of a portion of an asset management system.

FIG. 3 illustrates a portion of an asset management system 310. In FIG. 3, the portion of asset management system 310 includes a FDT-based application 300, an asset optimization device manager 312 and plant assets 301. It should be understood that asset management system 310 includes other components that are not particularly illustrated, such as a host system 303 configured to implement the asset management system.

FDT-based application 300 includes a FDT frame application 302, at least one communication DTM 208 and a RIO gateway Device Type Manager (DTM) 312. Asset optimization device manager 312 is an EDDL-based device manager that includes an asset optimization, parameterization and diagnostic software 316 that is coupleable to FDT-based application 300 by an interface component 318.

In one embodiment, asset management system 310 may not require the use of device DTMs or generic DTMs. In such an embodiment, there is no need for the EDDL-based asset optimization device manager 312 to be used in conjunction with device DTMs and generic DTMs. The EDDL-based asset optimization device manager 312 can be integrated with an FDT-based application 300 as illustrated in FIG. 3. In such an embodiment, FDT-based application 300 can optionally include a router DTM 320 (as indicated by dashed lines), optionally include a RIO gateway DTM 314 (as indicated by dashed lines) and include at least one communication DTM 308 or equivalent. In circumstances where both router DTM 320 and RIO gateway DTM 314 are included in FDT-based application 300, router DTM 320 enables asset optimization device manager 312 to exchange data with field devices or plant assets 301. Data requests are transferred from asset optimization device manager 312 to router DTM 320 via interface component 318 as shown by arrow 322. Router DTM 320 forwards the data request to RIO gateway DTM 314. RIO gateway DTM 314 connects the data requests to communication DTM 308 which forwards the data request to the appropriate plant asset 301 with has the appropriate communication protocol. Router DTM 220 then automatically handles the transfer of information that is in response to the data request which is ultimately distributed to asset optimization, parameterization, and diagnostic software 316. In this configuration and from the point of view of RIO gateway DTM 314, router DTM 320 is treated as either a device DTM or generic DTM even though none are included in FDT-based application 300.

In other circumstances, FDT-base application 300 includes just RIO gateway DTM 314. In such circumstances, RIO gateway DTM enables asset optimization device manager 312 to exchange data with field devices or plant assets 301. Data requests are transferred from asset optimization device manager 312 to RIO gateway DTM 314 via interface component 318 as shown by arrow 324. RIO gateway DTM 314 connects the data requests to communication DTM 308 which forwards the data request to the appropriate plant asset 301 that follows the appropriate communication protocol. RIO gateway DTM 314 then automatically handles the transfer of information that is in response to the data request which is ultimately distributed to asset optimization, parameterization and diagnostic software 316. In this configuration and from the point of view of communication DTM 308, RIO gateway DTM 314 is treated as either a device DTM or generic DTM even though none are included in FDT-based application 300.

In still other circumstances, FDT-based application 300 includes just communication DTM 308. In such circumstances, communication DTM 308 enables asset optimization device manager 312 to exchange data with field devices or plant assets 301. Data requests are transferred form asset optimization device manager 312 to communication DTM 308 via interface component 318 as shown by arrow 326. Communication DTM 308 forwards the data request to the appropriate plant asset 301 that has the appropriate communication protocol. Communication DTM 308 then automatically handles the transfer of information that is in response to the data request which is ultimately distributed to asset optimization, parameterization and diagnostic software 316.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while disclosed embodiments are described primarily with reference to specific components of an FDT-based application, it should be understood that other types of components in FDT-based application should be considered.

What is claimed is:

1. A Field Device Tool (FDT)-based system comprising:
   one or more processors;
   a FDT-based application comprising:
   at least one communication Device Type Manager (communication DTM) in the FDT-based application that corresponds with each type of communication protocol that an at least one plant asset follows, the communication DTM providing an interface for communication between the FDT-based application and the communication protocol that the plant asset follows;
   an asset optimization device manager that includes electronic device description language (EDDL), the asset optimization device manager including functionality for parameterization and performing diagnostics on the plant asset;
   a router Device Type Manager (router DTM)) in the FDT-based application coupled to the router DTM transferring data from the asset optimization device manager to the at least one communication DTM for communication with the plant asset to optimize the plant asset by parameterizing, and performing diagnostics on, the plant asset;
   at least one device-specific Device Type Manager (device DTM) in the FDT-based application including specific information about the at least one plant asset, wherein the device DTM is created by a manufacturer of the at least one plant asset;
   at least one generic Device Type Manager (generic DTM) in the FDT-based application including information that is non-specific to any plant asset, wherein the generic DTM is created by the FDT-based application, wherein the FDT-based application includes at least one of a device DTM or a generic DTM for each type of plant asset supported by the device DTM or generic DTM; and
   a remote input/output gateway Device Type Manager (RIO gateway DTM) in the FDT-based application connecting the router DTM with the communication DTM.

2. The FDT-based system of claim 1, wherein the router DTM transfers data from the asset optimization device manager via an interface component.

3. The FDT-based system of claim 1, wherein the router DTM is further configured to distribute information from the plant assets to the asset optimization device manager.

4. The FDT-based system of claim 1, wherein the router DTM is interposed between the device and generic DTMs and the RIO gateway DTM.

5. The FDT-based system of claim 4, wherein the router DTM is further configured to transfer data from the at least one device DTM and the at least one generic DTM to the RIO gateway DTM for transfer of data to the communication DTM for communication with the plant asset.

6. An asset management system comprising:
   one or more processors;
   an asset optimization device manager that includes electronic device description language (EDDL) for optimizing a plant asset by parameterzing the plant asset and performing diagnostics on the plant asset;
   a Field Device Tool (FDT)-based application comprising:
   at least one communication Device Type Manager (communication DTM) that corresponds with a type of communication protocol that the plant asset follows, the communication DTM providing an interface for communication between the FDT-based application and the communication protocol that the plant asset follows;

a router Device Type Manager (router DTM) transferring data from the asset optimization device manager to the at least one communication DTM for communication with the plant asset to optimize the plant asset;

at least one device-specific Device Type Manager (device DTM) including specific information about the plant asset, wherein the device DTM is created by a manufacturer of the plant asset;

at least one generic Device Type Manager (generic DTM) including information that is not specific to any plant asset, wherein the generic DTM is created by the FDT-based frame application; and a remote input/output gateway Device Type Manager (RIO gateway DTM) connecting the at least one device DTM and the at least one generic DTM to the communication DTM.

7. The asset management system of claim 6, wherein the router DTM transfers data from the asset optimization device manager via an interface component.

8. The asset management system of claim 6, wherein the router DTM is interposed between the device and generic DTMs and the RIO gateway DTM.

9. The asset management system of claim 8, wherein the router DTM is further configured to transfer data from the at least one device DTM and the at least one generic DTM to the RIO gateway DTM for transfer of data to the communication DTM for communication with the plant asset.

10. The asset management system of claim 8, wherein the router DTM is further configured to distribute data from the RIO gateway DTM to one of the device DTM, the generic DTM and the asset optimization device manager.

* * * * *